United States Patent Office 3,121,042
Patented Feb. 11, 1964

3,121,042
ORAL COMPOSITIONS CONTAINING 3-ENOL-
ETHERS OF METHYLTESTOSTERONE
Alberto Ercoli, 12 Via Circo, Milan, Italy
No Drawing. Filed Sept. 28, 1961, Ser. No. 141,318
Claims priority, application Germany May 4, 1959
13 Claims. (Cl. 167—74)

This invention relates to novel hormonal compositions and to certain novel compounds which may be included in such compositions having enhanced physiological effect, particularly enhanced androgenic and anabolic effect.

Methyltestosterone is known as an orally effective form of testosterone since it has the advantage over testosterone itself in being active when administered orally or sublingually. Although when orally given it is less effective than the parenterally administered natural hormone, methyltestosterone has resulted in a more general use of androgenic therapy. When orally administered, doses from 3 to 5 times as large as those of parenteral testosterone propionate are necessary in order to obtain the same physiological effect, when given sublingually, doses from one half to two thirds of the oral doses are effective, but in practice sublingual administration may cause remarkable differences in absorption, especially when the tablet is not kept until it dissolves completely, either between the cheek and the gum or under the tongue without swallowing any saliva. In addition, sublingual administration is troublesome and patients do not like it owing to the bitter and disagreeable taste of the steroid.

An object of the present invention is to provide novel hormonal compositions which possess enhanced androgenic and anabolic effect and are suitable for oral ingestion.

Another object of the invention is to provide a process for carrying out steroid therapy by the oral administration of the present novel compositions.

A still further object of this invention is to provide new alkyl enolethers of methyltestosterone which are orally particularly effective hormonal agents showing an androgenic and myogenic activity greater than that of methyltestosterone.

It has now been found that the 3-enol ethers of 17α-methyltestosterone are orally active hormonal agents showing an androgenic and myogenic activity greater than that of methyltestosterone itself.

Accordingly, the invention provides a hormonal preparation adapted for oral administration, comprising a methyltestosterone 3-enol ether dissolved or mixed in a sterile, liquid or solid, pharmaceutical carrier, preferably in a lipid carrier.

Prior to this invention certain 17α-methyltestosterone 3-enol ethers were known but had never been regarded as possible hormonal agents and their usefulness had been limited to their use as intermediates for the preparation of methyltestosterone starting from Δ⁴-androsten-3,17-dione. In this regard, there have been disclosed the ethyl and benzyl enol ethers of 17α-methyltestosterone.

The superior hormonal activity of the 3-enol ethers of 17α-methyltestosterone is unexpected since it had already been found that in the corresponding series of testosterones not containing a 17-alkyl group, the enol ethers possess generally an activity very inferior to that of the parent hormone. For instance, when parenterally given to male castrate rats, enol ethers of testosterone do not cause a significant increase in seminal vesicles and levator ani weights, owing to the lack of androgenic and myogenic potency. These compounds are not effective for oral administration.

On the contrary, enol ethers of 17α-methyltestosterone exhibit a greatly enhanced activity on oral administration, while by the parenteral route they are less effective than the parent hormone.

I have found that there are particular enolethers of methyltestosterone, not hitherto known, which when given orally in a sterile, liquid or solid, pharmaceutical carrier and preferably in a lipid carrier, exhibit a hormonal effect unexpectedly greater than that of methyltestosterone and the previously known enol ethers thereof.

The new compounds of this invention may be represented by the following formula:

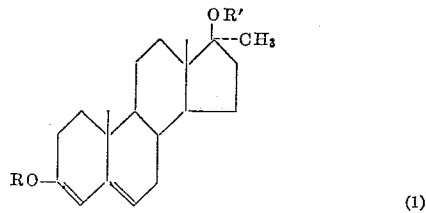

(1)

where R is alkyl which may be straight or branched, but which contains from 5 to 7 carbon atoms in the longest chain, or cycloalkyl of 5 or 6 carbon atoms and R' represents hydrogen or an acyl radical of a lower alkanoic acid, particularly one containing from one to three carbon atoms, inclusive. As examples of the radical "R" may be mentioned alkyl radicals such as n-amyl, n-hexyl, (2-methyl)pentyl, (4-methyl)pentyl, n-heptyl and cycloalkyl radicals such as cyclopentyl and cyclohexyl.

A particularly enhanced activity is realized with certain compounds coming within the broad definition given above, these being compounds in which R is an alkyl containing five or six carbon atoms in the longest chain or cycloalkyl containing five or six carbon atoms. Specific compounds found to be most active are the n-amyl enol ether, the cyclopentyl enol ether, the n-hexyl enol ether, the (4-methyl)pentyl enol ether and the cyclohexyl enol ether of 17α-methyltestosterone.

The distinct superiority of the oral androgenic and myogenic activity of the 3-enol ethers of 17α-methyltestosterone is shown in the table below which summarizes the pharmacological results obtained, in the usual test for the evaluation of the hormonal activity, by some of the representative compounds of the compositions of this invention compared with that of 17α-methyltestosterone.

TABLE I

| Test compound | Oral androgenic activity | Oral myogenic activity |
| --- | --- | --- |
| 17α-methyltestosterone (standard) | 1 | 1 |
| 17α-methyltestosterone n-amyl enol ether | 4.1 | 2.7 |
| 17α-methyltestosterone-cyclopentyl enol ether | 7 | 4.3 |
| 17α-methyltestosterone-n-hexyl enol ether | 4.5 | 3.7 |
| 17α-methyltestosterone-(4-methyl)pentyl enol ether | 6.6 | 4.1 |
| 17α-methyltestosterone-cyclohexyl enol ether | 6.4 | 5 |

By the term "17α-methyltestosterone 3-enol ethers" as used herein is to be understood derivatives of 17α-methyltestosterone having at the 3-position, linked to the oxygen atom in the typical structure of an ether, a residue of an aliphatic, alicyclic, arylaliphatic, aromatic or heterocyclic hydrocarbon. Such a residue may be, for example, a straight or branched chain alkyl group which may be substituted, e.g. by halogen, or an alkylene group, such as ethylene, an aralkyl group, such as benzyl, a tetrahydropyranyl group, or a sugar residue such as that of glucose, galactose, or maltose.

The cycloalkyl radical may also contain alkylic sidechains and may be linked to the oxygen atom at the 3-position by an alkylene group.

The hydroxy group at the 17β-position may be free or blocked in the form of an ester with an aliphatic, alicyclic, arylaliphatic, aromatic or heterocyclic carboxylic acid.

Preferred and advantageous compounds for the compositions of this invention are alkyl or cycloalkyl enol ethers of free or acylated 17α-methyltestosterone, particularly alkyl enol ethers in which the longest chain of the alkyl radical contains from 5 to 7 carbon atoms and cycloalkyl enol ethers in which the cycloalkyl radical contains 5 or 6 carbon atoms.

The enol ethers of 17α-methyltestosterone may be associated with any solid or liquid pharmaceutical carrier which is not incompatible with the active material. Thus the compositions of this invention may take the form of tablets, powders, capsules, syrups or other dosage forms particularly suitable for oral ingestion. Preferably, the enol ether will be present in a proportion of 0.1 to 7% by weight of the pharmaceutical carrier.

When the active material is mixed with any of the solid diluents and/or tabletting adjuvants used in pharmaceutical practice, it is advisable to stabilize such compositions by adding suitable buffer substances or alternatively an alkaline substance (for example an alkaline oxide or carbonate) in order to prevent the 3-enol ethers of 17α-methyltestosterone from hydrolyzing, since these active ingredients may dissociate in an acidic medium, giving the corresponding free 17α-methyltestosterone which is less effective as an oral hormone. These compositions can also be suitably coated in order to protect them from the action of gastric juice. With the same purpose in mind, the active material may be introduced, alone or mixed with suitable diluents or stabilizing agents, into suitable gelatin capsules or another enteric-resistant material that acts as a solid carrier.

A preferred pharmaceutical carrier in the compositions according to the present invention is a lipid, from animal or vegetable sources, either in solid or liquid form and preferably having a high coefficient of digestibility.

As acceptable carriers, there can be used oils which are liquid, or fats or butters which are solid or semisolid at ordinary atmospheric temperatures. Examples of suitable oils include coconut oil, corn oil, cottonseed oil, lard oil, linseed oil, olive oil, sunflowerseed oil, palm oil, peanut oil, sesame oil, soya bean oil, wheat germ oil and egg yolk oil. Suitable fats include butterfat, lard, cocoa butter, margarine fat and the like.

Suitable lipid carriers also include mono- and diglycerides and synthetic triglycerides, that is, esters of glycerol with higher molecular weight or long-chain aliphatic acids, either saturated or unsaturated, known as fat or fatty acids. Instead of glycerides the free fatty acids contained in the fats or oils themselves can be employed.

The 3-enol ethers of 17α-methyltestosterone are mixed with one or more such vehicles and dissolved therein thus obtaining a lipidic composition containing the active ingredient, which is stable, homogeneous, of defined dosage form and particularly suitable for oral ingestion. Such a composition can be administered as such or preferably in the form of a capsule, e.g. of gelatine or other material soluble or disintegrable in the alimentary tract.

The compositions can also contain some small amounts of other substances, as for instance androgenic and/or anabolic steroid hormones. There may, if desired, be added to compositions of the present invention, pharmaceutically acceptable agents, such as antiseptics, antioxidants and/or preservatives to prolong the stability of the active ingredients and prevent them from oxidizing or otherwise being degraded.

The compositions of this invention are useful in the treatment of prepuberal hypogenitalism and hypogenitalism in the adult, in neurodepressive disorders, in hemorrhagic endometrioses of the woman, in cases of dysmenorrhea, menometrorrhagia and menopausal symptoms. In the compositions of this invention the 3-enol ethers of 17α-methyltestosterone or its esters are present in an amount sufficient to produce therapeutic effects. In general, the amount is of from about 1 mg. to about 50 mg. preferably from about 2.5 mg. to about 30 mg., per dosage unit.

The method of this invention comprises orally administering to humans, in an amount sufficient to produce therapeutic effects, 17α-methyltestosterone 3-enol ethers in admixture with a nontoxic pharmaceutical carrier as exemplified above. The 3-enol ethers advantageously will be in an amount of from about 1 mg. to about 50 mg. and preferably from about 2.5 mg. to about 30 mg.

The administration is by the oral route, advantageously in equal doses one to four times daily to give a daily dosage of from about 2 mg. to about 100 mg. and preferably from about 5 mg. to about 60 mg.

The 3-enol ethers of 17α-methyltestosterone of the present invention can be generally obtained from the corresponding 3-enol ethers of $\Delta^4$-androstene-3,17-dione by treatment with methyl magnesium halide Grignard reagent, in order to convert the 17-keto group to a 17β-hydroxy, 17α-methyl grouping.

Enol ethers of androstenedione, such as ethyl, benzyl and cyclohexyl, are well-known in the prior art. Other enol ethers can be obtained by means of an exchange reaction as disclosed in the copending application Serial No. 26,711, filed on May 4, 1960, now Patent No. 3,019,241, and entitled "Process for the Preparation of Enol Ethers of $\Delta^4$-3-Ketosteroids," which comprises heating the preformed ethyl enol ether of androstenedione with an excess of the desired alcohol, in solution of a non-polar solvent such as benzene, cyclohexane, dioxan or tetrahydrofuran and in the presence of an acid catalyst.

Some alkyl and benzyl enol ethers of 17α-methyltestosterone, especially those substituted with functional groups such as nitro and halo groups, can be also prepared by treatment of 17α-methyltestosterone itself with the desired alcohol (e.g. ethylene chlorohydrin or benzyl alcohol or one of the nitro-substituted aralkylalcohols), carrying out the reaction in isooctane which on account of its high boiling point (almost identical with that of water) facilitates the course of the reaction.

In order that the invention may be well understood, the following examples are given by way of illustration only.

*Example 1*

A. A mixture containing 4.2 g. of androstenedione, 4 cc. of ethyl orthoformate, 5 cc. of absolute ethyl alcohol, 20 cc. of tetrahydrofuran and 30 mg. of p-toluenesulfonic acid was stirred at about 20° C. until the solids dissolved. The resulting solution was poured into a one liter flask containing 400 cc. of anhydrous benzene and 12 cc. of n-amyl alcohol and the mixture heated to reflux for forty minutes. The solution was cooled, neutralized with a little pyridine and the liquid evaporated under reduced pressure.

The residue on recrystallization from methanol containing a trace of pyridine gave 3-enol n-amyl ether of androstenedione, melting at 104–106° C.; $[\alpha]_D = -76°$ (dioxan). Yield: 90% of the theoretical amount.

B. In a 3-necked flask fitted with a dropping funnel, reflux condenser, stirrer, and nitrogen inlet tube, there was placed a solution of 25 g. of methyl magnesium bromide in 150 cc. of ether. With stirring and under an atmosphere of nitrogen, a solution of 4 g. of androstenedione 3-n-amyl enol ether in 80 cc. of anhydrous benzene was added slowly.

The reaction mixture was refluxed for 1 hour and allowed to stand overnight at room temperature. The reaction mixture was then treated with an aqueous solution of 30% ammonium chloride, the organic layer separated off, washed with waer and dried over anhydrous sodium sulfate.

The solvent was evaporated and the residue taken up with dilute methanol to give 3.2 g. of a white product. Crystallization from methanol containing a few drops of pyridine gave the pure methyltestosterone 3-enol n-amyl ether having a melting point of 96–98° C.; $[\alpha]_D = -134.5°$ (dioxan).

Example 2

A. To a solution of 10 g. of 3-enol ethyl ether of androstenedione in 800 cc. of anhydrous benzene were added 25 cc. of 2-methylpentanol (boiling point 148° C.) and 50 mg. of benzene sulfonic acid. The mixture was heated and distilled for about half an hour so that the ethyl alcohol which formed during the reaction was completely removed. To the residual solution, after cooling, a few drops of pyridine were added and the solvent evaporated in vacuo. The residue, recrystallized from methyl alcohol consisted of 3-enol (2-methyl)pentyl ether of androstenedione, M.P. 87–90° C.; $[\alpha]_D = -69°$ (dioxan). Yield: 9 g.

B. To a mixture of 10 g. of magnesium and 160 cc. of anhydrous ether, a solution of 42 g. of methyl bromide in 120 cc. of anhydrous ether was added slowly during a ten-minute period. When the reaction with magnesium was complete, 9 g. of androstenedione (2-methyl)pentyl enol ether were added and the reaction mixture treated as in Example 1, part B, gave 7.3 g. of 3-enol (2-methyl)pentyl ether of 17α-methyltestosterone; M.P. 85–89° C.; $[\alpha]_D = -120°$ (dioxan).

In the same manner as above, (4-methyl)pentyl enol ether of androstenedione was prepared at M.P. 119–121° C. and converted to the corresponding (4-methyl)pentyl enol ether of 17α-methyltestosterone (M.P. 102–103° C.).

Example 3

To 600 cc. of anhydrous benzene were added 0.15 g. of p-toluenesulfonic acid and a portion of the solvent was distilled off azeotropically to remove any possible trace of moisture. A mixture of 6 cc. of n-hexyl alcohol and 3 g. of 3-enol ethyl ether of androstenedione was added and distillation was continued for about 30 minutes. After neutralization with pyridine and evaporation of the solvent, a residue was obtained which, taken up with ether, filtered, dried and then recrystallized from methanol containing a trace of pyridine, gave 3-enol n-hexyl ether of androsten-3,17-dione, M.P. 85–87° C.; $[\alpha]_D = -92°$ (dioxan).

This compound was then reacted with methyl magnesium bromide in ether solution according to the procedure described in Example 1, part B, and thus converted to the cotrresponding 2-enol n-hexyl ether of 17α-methyltestosterone, M.P. 79–81° C.; $[\alpha]_D = -131°$ (dioxan).

Example 4

By reacting 3-ethyl enol ether of androstenedione with the appropriate alcohol in benzene solution according to the procedure described in Example 2, part A, other representative androstenedione 3-alkyl enol ethers were prepared, including 3-enol butyl (M.P. 140–144° C.); 3-enol sec.butyl (M.P. 132–134° C.); 3-enol isobutyl (M.P. 144–147° C.), 3-enol isoamyl (M.P. 113–115° C.), 3-enol heptyl (M.P. 66–67° C.), 3-enol (1,3-dimethyl)butyl (M.P. 122–124° C.), 3-enol (2-ethyl)butyl (M.P. 83–85° C.), 3-enol octyl (M.P. 65–66° C.).

These compounds were then reacted with methyl magnesium bromide, according to the procedure described in Example 1, part B, and converted to the corresponding 17α-methyltestosterone 3-enol ethers: 3-enol butyl (M.P. 102–104° C.), 3-enol sec.butyl (M.P. 131–134° C.), 3-enol isobutyl (M.P. 128–130° C.), 3-enol isoamyl (M.P. 121–125° C.), 3-enol heptyl (M.P. 62–64° C.), 3-enol (1,3-dimethyl)butyl (M.P. 113–115° C.), 3-enol (2-ethyl)butyl (M.P. 106–107° C.), 3-enol octyl (M.P. 35–41° C.).

Example 5

10 g. of 3-enol ethyl ether of androstenedione were dissolved in about 800 cc. of anhydrous benzene and treated with a mixture of 1.2 g. of p-toluenesulfonic acid and 18 cc. of cyclopentanol. The reaction mixture processed as in Example 3 gave 3-enol cyclopentyl ether of androstenedione, M.P. 181–3° C.; $[\alpha]_D = -88.5°$ (dioxan).

Treating this compound with methyl magnesium bromide as above, the corresponding 3-enol cyclopentylether of 17αmethyltestosterone was obtained melting at 148–152° C.; $[\alpha]_D = -150°$ (dioxan).

Similarly, androstenedione 3-enol cyclohexyl ether was prepared and converted to the 17α-methyltestosterone 3-enol cyclohexyl ether, M.P. 142–44° C.; $[\alpha]_D = -136°$ (dioxan).

In the same manner, 3-enol (3-cyclopentyl)propyl ether and 3-enol (2-ethyl)cyclopentyl ether of 17α-methyltestosterone are obtained.

Example 6

To a suspension of 5 g. of methyltestosterone in 500 cc. of pure isooctane (2,2,4-trimethylpentane) were added 2.5 cc. of benzyl alcohol and 0.25 g. of p-toluensulfonic acid. The mixture was refluxed for 32 hours employing an apparatus (similar to that described in Org. Synt. 3, page 382), equipped in such a way that the isooctane falling from the condenser before returning to the flask, was separated from the water entrained by it, by means of a suitable trap supplied with an inner funnel containing phosphorus pentoxide mixed with a filter aid (Celite and the like). After cooling, a few drops of pyridine were added and the solvent completely evaporated to dryness in vacuo. The solid residue, recrystallized from methanol containing a little pyridine, gave 2.5 g. of 3-enol benzyl ether of 17α - methyltestosterone, M.P. 132–35° C.; $[\alpha]_D = -128°$ (dioxan).

Example 7

Following the same procedure as in Example 6 and substituting ethylene chlorohydrin for benzyl alcohol, the 3-enol chloroethyl ether of 17α-methyltestosterone was obtained having a melting point of 120–122° C.

Similarly, 4-chlorobutyl enol ether was prepared having a melting point of 90–93° C.

Example 8

To a solution of 3 g. of 17α-methyltestosterone acetate in 20 cc. of tetrahydrofuran were added 3 cc. of ethyl orthoformate and 20 mg. of p-toluensulfonic acid. The reaction mixture was allowed to stand at room temperature for a two hour period, then neutralized with a little pyridine. The product which precipitated was filtered off, dried and recrystallized from methyl alcohol. The pure 3-enol ethyl ether of 17α-methyltestosterone acetate was obtaining having a melting point of 132–33° C.; $[\alpha]_D = -123 \pm 1°$ (dioxan).

In the same manner as above 3-enol ethyl ether of 17α-methyltestosterone propionate was prepared.

Example 9

50 g. of 3-enol n-amyl ether of 17α-methyltestosterone, ground to a fine powder (preferably micronized), were suspended in a two liter mixture of sesame oil and olive oil. The mixture was carefully heated on a water bath with occasional shaking of the suspension so as to obtain a clear and homogeneous solution. After cooling, the solution was introduced into capsules of 0.8 cc. each, so that each contained about 20 mg. of 3-enol n-amyl ether of 17α-methyltestosterone. The capsules provide a stable pharmaceutical composition for oral use, very effective for its therapeutic properties.

Example 10

28 g. of 3-enol (2-methyl)pentyl ether of 17α-methyltestosterone was added to 2.5 liters of sunflowerseed oil containing propyl gallate in the proportion of 8 mg./liter. The mixture was heated on a water bath, the suspension being occasionally shaken and the temperature slowly raised until dissolution was complete. The clear and homogeneous solution was transferred into 0.8 cc. capsules so that each capsule contained about 9 mg. of 3-enol (2-methyl) pentyl ether of 17α-methyltestosterone.

*Example 11*

PHARMACOLOGICAL TESTING

The hormonal activity of some representative 17α-methyltestosterone 3-enol ethers of the compositions of this invention was evaluated by comparison with that of methyltestosterone on the assay for androgenic and myogenic activity performed according to Hershberger et al. (Proc. Soc. Exp. Biol. Med. 83, 175, 1953).

Male albino rats, initial weight 40–45 g. and maintained on standard diet were used. The animals were castrated under ether anaesthesia and the oral treatment with the test compounds in 0.2 cc. sesame oil solution started on the day of castration and lasted for seven consecutive days.

The animals were killed during the 8th day and the weights of ventral prostata, levator ani muscle and seminal vesicles, without coagulating glands and devoid of fluid, were determined to the nearest 0.5 mg. The results of the tests of this example are reported in Table II, and these results show that the 3-enol ethers of 17α-methyltestosterone, administered orally at equivalent doses, exhibit a statistically significant increase in activity over 17α-methyltestosterone.

*Example 14*

Soft gelatin capsules were prepared containing from about 2.5 mg. to about 25 mg. of 17α-methyltestosterone 3-enol n-heptyl ether in one milliliter of peanut oil. These capsules provide an oral hormonal composition which is satisfactory for clinical use.

*Example 15*

A mixture of 8 g. of 17α-methyltestosterone 3-enol iso-butyl ether and 7 g. of 17α-methyltestosterone 3-enol sec. butyl ether was dissolved by gently heating in 500 cc. of mixed corn oil and wheat germ oil (1:1) and 0.8 cc. portions of the resulting solution were placed in soft gelatin capsules.

*Example 16*

In the same manner as in Examples 9 and 10, lipidic oral compositions of 3-enol cyclohexyl ether of 17α-methyltestosterone were prepared by using sesame oil, olive oil and sunflower seed oil singly or in admixture as liquid carriers.

*Example 17*

Tablets were prepared according to the following composition:

| | Mg. |
|---|---|
| 3-enol cyclopentyl ether of 17α-methyltestosterone | 12 |
| Placebo granules | 110 |
| Talc | 9 |
| Magnesium stearate | 25 |
| Sodium carbonate | 4 |

TABLE II

| Treatment | Dose/rat/day μMoles | Dose/rat/day mg. | Number of animals | Organ weight (mg./100 gm. body weight) Seminal vesicles | Ventral prostata | Levator ani |
|---|---|---|---|---|---|---|
| Controls | | | 20 | 5.7±0.2 | 14.2±0.6 | 19.7±0.8 |
| Methyltestosterone | 1 | 0.302 | 40 | 12.5±0.6 | 60.3±2.0 | 29.6±1.0 |
| Do | 1.5 | 0.453 | 20 | 15.6±1.2 | 67.6±3.3 | 35.0±1.7 |
| Do | 2 | 0.604 | 50 | 17.2±0.7 | 75.5±2.0 | 37.0±1.0 |
| Methyltestosterone ethyl enol ether | 1 | 0.330 | 10 | 17.2±2.6 | 73.3±5.8 | 36.3±2.2 |
| Methyltestosterone n-butyl enol ether | 1 | 0.358 | 10 | 23.9±1.7 | 86.2±8.0 | 42.0±2.9 |
| Methyltestosterone iso-butyl enol ether | 1 | 0.358 | 10 | 25.3±2.9 | 89.7±4.5 | 39.6±3.0 |
| Methyltestosterone sec-butyl enol ether | 1 | 0.358 | 10 | 22.6±2.3 | 90.6±9.6 | 39.6±1.8 |
| Methyltestosterone n-amyl enol ether | 1 | 0.372 | 10 | 41.4±3.4 | 103.9±4.9 | 53.0±3.0 |
| Methyltestosterone isoamyl enol ether | 1 | 0.372 | 10 | 27.2±1.4 | 80.5±6.2 | 41.9±2.9 |
| Methyltestosterone n-hexyl enol ether | 1 | 0.386 | 20 | 33.9±2.0 | 94.3±5.4 | 46.3±1.8 |
| Methyltestosterone (2-methyl)pentyl enol ether | 1 | 0.386 | 20 | 32.9±1.6 | 85.9±3.8 | 49.0±1.9 |
| Methyltestosterone (2-ethyl) butyl enol ether | 1 | 0.386 | 10 | 22.5±2.6 | 80.0±3.4 | 34.4±1.7 |
| Methyltestosterone n-heptyl enol ether | 1 | 0.400 | 20 | 33.8±2.0 | 91.5±5.4 | 49.4±2.2 |
| Methyltestosterone n-octyl enol ether | 1 | 0.414 | 10 | 22.0±2.6 | 64.7±5.3 | 37.3±3.2 |
| Methyltestosterone cyclohexyl enol ether | 1 | 0.384 | 20 | 35.9±2.0 | 100.3±4.5 | 49.2±2.2 |
| Methyltestosterone benzyl enol ether | 1 | 0.392 | 10 | 21.7±2.6 | 82.6±5.5 | 40.0±2.3 |

*Example 12*

An oral composition was prepared with the following components:

| | Mg. |
|---|---|
| 17α-methyltestosterone 3-enol hexyl ether | 5 |
| Magnesium stearate | 25 |
| Magnesium oxide | 20 |
| Lactose | 200 |

The above ingredients were screened, mixed and filled into hard gelatin capsules.

*Example 13*

Tablets were prepared with the following ingredients:

| | Mg. |
|---|---|
| 17α-methyltestosterone 3-enol benzyl ether | 15 |
| Rich starch | 20 |
| Lactose | 50 |
| Talc | 10 |
| Calcium carbonate and magnesium oxide | 35 |
| Sugar coating, approximately | 50 |

The placebo granules contained 60% of lactose and 40% of corn starch.

The tablets were then enteric coated.

*Example 18*

22 g. of micronized 3-(2-ethyl)pentyl enol ether of 17α-methyltestosterone were dissolved by gently heating in one liter of corn oil mixture containing 10% of cholesteryl oleate. 0.6 cc. portions of the resulting cooled solution was placed in soft gelatin capsules.

*Example 19*

A liquid preparation for therapeutic purposes containing one percent of 3-enol chlorobutyl ether of 17α-methyltestosterone was prepared by using a mixture of olive oil and linoleic acid (5:1) as liquid carrier.

This application is a continuation-in-part of my U.S. application Serial No. 26,715, filed on May 4, 1960, now abandoned.

I claim:

1. An oral composition in dosage unit form comprising from about 1 mg. to about 50 mg. of a 3-enol ether of a steroid compound selected from the group consisting of 17α-methyltestosterone and its esters together with a pharmaceutical carrier.

2. An oral composition as defined in claim 1 in which said 3-enol ether of 17α-methyltestosterone is a cycloalkyl enol ether.

3. An oral composition as defined in claim 1 in which said pharmaceutical carrier is an oil or fat having a high coefficient of digestibility.

4. An oral composition as defined in claim 1 in which said pharmaceutical carrier is selected from the group consisting of a higher fatty acid and a glyceride of a higher fatty acid.

5. An oral composition in dosage unit form comprising from about 1 mg. to about 50 mg. of a 3-enol ether of 17α-methyltestosterone and a carrier comprising at least one orally ingestible lipid, said composition being contained in a capsule composed of material soluble or disintegrable in the alimentary tract.

6. An oral composition in dosage unit form comprising from about 1 mg. to about 50 mg. of a compound of the formula

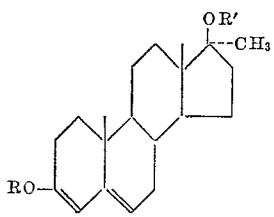

where R is a member selected from the group consisting of an alkyl radical having at least 5 and no more than 7 carbon atoms in the longest chain and a cycloalkyl radical containing at least 5 and no more than 6 carbon atoms, and R' is selected from the group consisting of hydrogen and the acyl radical of a lower alkanoic acid together with a pharmaceutical carrier.

7. An oral composition in dosage unit form comprising from about 2.5 mg. to 30 mg. of a 3-enol ether of 17α-methyltestosterone together with an orally ingestible lipid.

8. An oral composition in dosage unit form comprising from about 1 mg. to about 50 mg. of 17α-methyltestosterone 3-n-hexyl enol ether together with an orally ingestible lipid.

9. An oral composition in dosage unit form comprising from about 1 mg. to about 50 mg. of 17α-methyltestosterone 3-cyclopentyl enol ether together with an orally ingestible lipid.

10. A method of steroid therapy which comprises orally administering daily to a human patient from about 2 mg. to about 100 mg. of a 3-enol ether of a steroid compound selected from the group consisting of 17α-methyltestosterone and its esters.

11. The method of claim 10 in which there is administered daily from 5 mg. to 60 mg. of the 3-enol ethers of 17α-methyltestosterone.

12. The method of claim 10 in which said 3-enol ether is the 3-n-hexyl enol ether.

13. The method of claim 10 in which said 3-enol ether is the 3-cyclopentyl enol ether.

References Cited in the file of this patent
UNITED STATES PATENTS

| | | |
|---|---|---|
| 2,344,997 | Miescher | Mar. 28, 1944 |
| 2,835,667 | Ercoli et al. | May 20, 1958 |
| 2,883,325 | Agnello et al. | Apr. 21, 1959 |